United States Patent
Riley

(10) Patent No.: US 8,984,883 B2
(45) Date of Patent: Mar. 24, 2015

(54) HYDROPOWER AND GEOTHERMAL ENERGY SYSTEM AND METHODS

(71) Applicant: William Riley, Captiva, FL (US)

(72) Inventor: William Riley, Captiva, FL (US)

( * ) Notice: Subject to any disclaimer, the term of this patent is extended or adjusted under 35 U.S.C. 154(b) by 232 days.

(21) Appl. No.: 13/869,270

(22) Filed: Apr. 24, 2013

(65) Prior Publication Data

US 2013/0283791 A1    Oct. 31, 2013

Related U.S. Application Data

(60) Provisional application No. 61/639,507, filed on Apr. 27, 2012.

(51) Int. Cl.
*F03G 7/04* (2006.01)

(52) U.S. Cl.
CPC .. *F03G 7/04* (2013.01); *Y02E 10/10* (2013.01)
USPC ................ 60/641.2; 60/675; 290/1 R; 290/52

(58) Field of Classification Search
CPC ............. F03G 7/00; F03G 7/04; F04D 13/04; Y02E 10/10
USPC ......... 60/641.2–641.4, 675, 398; 290/1 R, 52
See application file for complete search history.

(56) References Cited

U.S. PATENT DOCUMENTS

| | | | | |
|---|---|---|---|---|
| 3,939,356 A | * | 2/1976 | Loane | 290/52 |
| 4,142,108 A | * | 2/1979 | Matthews | 290/1 R |
| 4,255,933 A | * | 3/1981 | Bailey et al. | 60/641.2 |
| 5,389,821 A | * | 2/1995 | Moulliet | 290/1 R |
| 7,615,882 B2 | | 11/2009 | Riley | |
| 7,656,050 B2 | | 2/2010 | Riley | |
| 8,215,104 B2 | | 7/2012 | Riley | |
| 2009/0121481 A1 | | 5/2009 | Riley | |
| 2009/0126923 A1 | | 5/2009 | Montgomery et al. | |
| 2009/0211757 A1 | | 8/2009 | Riley | |
| 2010/0077749 A1 | | 4/2010 | Riley | |
| 2011/0041500 A1 | | 2/2011 | Riley | |
| 2011/0233937 A1 | | 9/2011 | Riley | |
| 2012/0001429 A1 | | 1/2012 | Saar et al. | |
| 2012/0285539 A1 | | 11/2012 | Riley | |

FOREIGN PATENT DOCUMENTS

WO    2011-017771    2/2011

* cited by examiner

*Primary Examiner* — Hoang Nguyen
(74) *Attorney, Agent, or Firm* — Fish & Richardson P.C.

(57) ABSTRACT

A hydroelectric and geothermal system includes a fluid communication channel that includes a first portion that extends from the earth's surface toward a subterranean hot area, a second portion connected to the first portion and in thermal communication with the subterranean hot area, and a third portion connected to the second portion and that extends to the earth's surface. A first turbine generator is configured to convert kinetic energy of a fluid flowing substantially under the influence of gravity in the first portion of the fluid communication channel into electrical energy. A second turbine generator is configured to convert kinetic energy of a vapor flowing within or out from the third portion of the fluid communication channel into electrical energy. The system also includes a valve arrangement configured for manipulation to hold the fluid in the second portion of the fluid communication channel in thermal communication with the subterranean hot area to produce the vapor.

22 Claims, 2 Drawing Sheets

HYDROPOWER AND GEOTHERMAL ENERGY SYSTEM AND METHODS

CROSS REFERENCE TO RELATED APPLICATIONS

This application claims priority from U.S. Provisional Application Ser. No. 61/639,507, filed on Apr. 27, 2012, which is incorporated herein by reference in its entirety.

SUMMARY

A system is described that, in some implementations, is made up of a pipe or well bore from the surface to hot, deep areas underground, another pipe or well bore from that point to another point distant from the first, penetrating the hot, deep area, and a third pipe or well bore from that distant point back to the surface. When connected, all three are part of the same system.

In this system, a fluid will be passed from the surface to the hot, deep area in the first well bore or pipe substantially by gravity and in the course of doing so will cause turbines installed within that well bore or pipe to turn, thereby generating electricity, which will be returned to the surface by electric wires.

Thereafter the fluid will pass into the hot, deep region through the second well bore or pipe. When that well bore or pipe is, for example, substantially full, a valve, located below the turbines in the first well bore or pipe will close, sealing off that portion of the system. Another valve, located at the point the second well bore or pipe meets the third, return, pipe also will close, sealing off the fluid.

The fluid in the second well bore or pipe will be heated by the surrounding rock until it reaches a suitable point above boiling. When it has done so, the second valve will open, allowing the steam created by the subsurface heat to ascend to the surface through the third well bore or pipe, which may be insulated, where it may be used to turn another turbine to create more electric power.

When the cycle has been completed, it will be resumed as described above. There are several embodiments which may make this system more useful and cost efficient, for example:

1. In some cases existing wells, originally drilled for other purposes, may be used to send the fluid to depth or return it or both, thereby reducing new well bore or pipe required, and the cost of the system.

2. In some cases such existing wells may be both vertical and horizontal, such as in some fracking wells.

3. In some cases, existing fracking fluid may be used as the input fluid in this system, and may be improved in quality by being converted to steam.

4. In some cases the input fluid may be composed partially of CO2. In cases where the hot rock at depth is limestone or related rock type, this will allow elimination or reduction of CO2, while simultaneously expanding the size of the well bore or tube, due to reaction between the CO2 and the rock.

In one aspect of the invention, a system includes a fluid communication channel that includes a first portion that extends from the earth's surface toward a subterranean hot area, a second portion connected to the first portion and in thermal communication with the subterranean hot area, and a third portion connected to the second portion and that extends to the earth's surface. The system further includes a first turbine generator and a second turbine generator. The first turbine generator is configured to convert kinetic energy of a fluid flowing substantially under the influence of gravity in the first portion of the fluid communication channel into electrical energy. The second turbine generator is configured to convert kinetic energy of a vapor flowing within or out from the third portion of the fluid communication channel into electrical energy. The system also includes a valve arrangement configured for manipulation to hold the fluid in the second portion of the fluid communication channel in thermal communication with the subterranean hot area to produce the vapor.

According to another aspect, a method includes enabling fluid to flow, substantially under the influence of gravity, through a first portion of a fluid communication channel toward a second portion of the fluid communication channel that is in thermal communication with a subterranean hot area. The method also includes converting, with a first turbine generator, kinetic energy of the fluid flowing through the first portion of the fluid communication channel into electrical energy. A valve arrangement is manipulated to hold the fluid in the second portion of the fluid communication channel that is in thermal communication with the subterranean hot area for a period of time. The fluid from the second portion of the fluid communication channel is released to flow, as vapor through a third portion of the fluid communication channel. The method also includes converting, with a second turbine generator, kinetic energy of the vapor flowing within or out of the third portion of the fluid communication channel, into electrical energy.

Other aspects, features and advantages will be readily apparent from the following detailed description, the accompanying drawings, and the claims.

DETAILED DESCRIPTION

Figure 1:
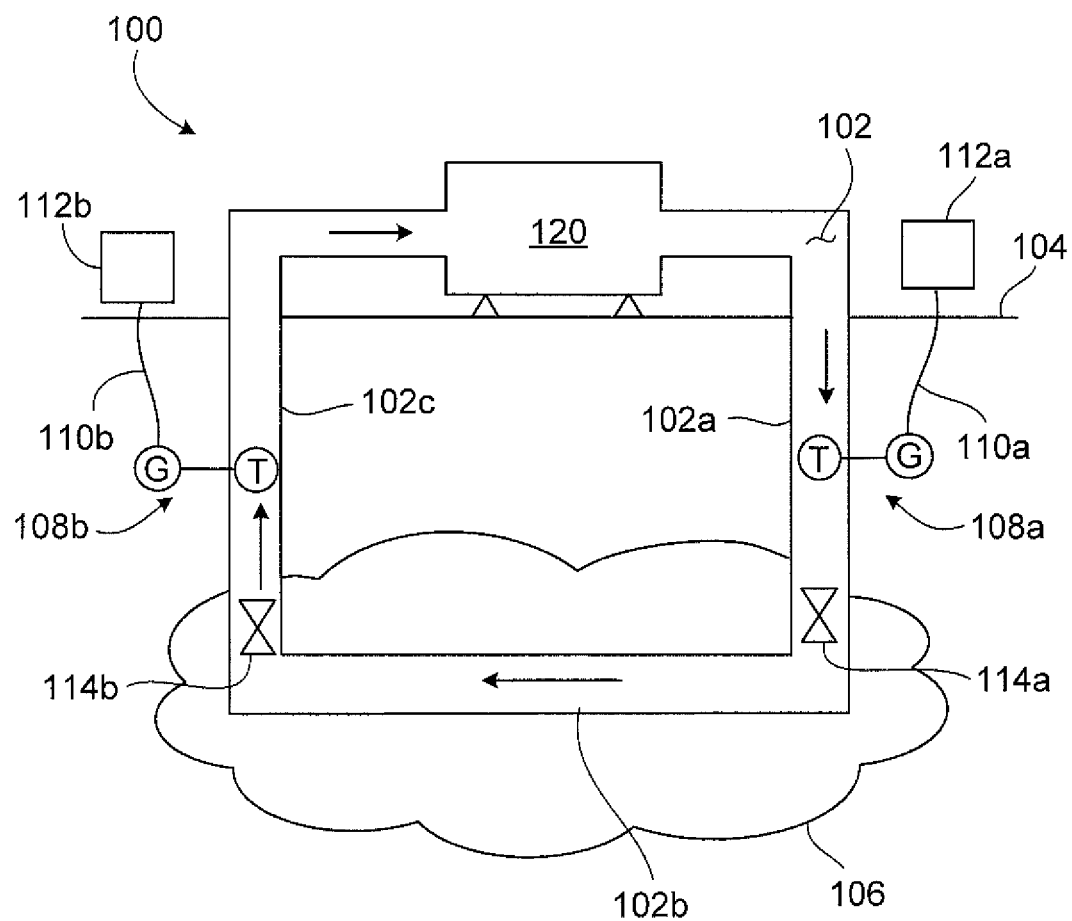
FIG. 1 is a schematic diagram showing an exemplary implementation of a hydroelectric and geothermal system.

As shown in FIG. 1, a hydroelectric and geothermal system 100 includes a fluid communication channel 102 with a first portion 102a that extends from the earth's surface 104 toward a subterranean hot area 106 (e.g., a hot dry rock), a second portion 102b connected to the first portion 102a and in thermal communication with the subterranean hot area 106, and a third portion 102c connected to the second portion and that extends to the earth's surface.

A first turbine generator 108a is configured to convert kinetic energy of a fluid flowing substantially under the influence of gravity in the first portion 102a of the fluid communication channel 102 into electrical energy. The electrical energy can be carried via electrical wires 110a to an electrical distribution panel 112a, which, in the illustrated implementation, is above the earth's surface.

A second turbine generator 108b is configured to convert kinetic energy of a vapor flowing within the third portion 102c of the fluid communication channel 102 into electrical energy. The electrical energy can be carried via electrical wires 110b to an electrical distribution panel 112b, which, in the illustrated implementation, is above the earth's surface.

In some implementations, electricity from the first and second turbine-generators is carried to the electrical distribution panel.

A valve arrangement, including, in the illustrated implementation, a first valve 114a and a second valve 114b, is configured for manipulation to hold the fluid in the second portion 102b of the fluid communication channel 102 in thermal communication with the subterranean hot area to produce vapor.

In the illustrated implementation, the first valve 114a is upstream of part of the second portion of the fluid communication channel that is in thermal communication with the subterranean hot area and the second valve 114b is downstream of the part the second portion of the fluid communication channel that is in thermal communication with the subterranean hot area.

Moreover, the first valve 114a is in the first portion 102a of the fluid communication channel downstream of the first turbine-generator 110a, and the second valve 114b is in the third portion 102c of the fluid communication channel upstream of the second turbine-generator 108b.

In some implementations, operation of the first valve 114a and the second valve 114b is automated such that the first valve 114a and the second valve 114b close when a threshold volume of fluid is present in the fluid communication channel 102 between the first valve 114a and the second valve 114b. Moreover, in some implementations, operation of the second valve 114b is further automated such that the second valve 114b opens, after a period of time when the first and second valves have been closed, under threshold conditions, to permit vapor, that has formed in the fluid communication channel 102 between the first 114a and second 114b valves to flow up through the third portion 102c of the fluid communication channel.

As shown, the second portion 102c of the fluid communication channel is in physical contact with the subterranean hot area 106.

In certain embodiments, the second turbine generator 108b can be positioned above the earth's surface 104.

The illustrated system 100 includes a vapor condensing unit 120 (which can be any kind of unit that utilizes residual heat or causes vapor to condense) between the third portion 102c of the fluid communication channel and the first portion 102a of the fluid communication channel.

In some implementations, the subterranean hot area is hot dry rock. However, the subterranean hot area can be any area that is able to provide a sufficient amount of heat to the fluid in the second portion 102b of the fluid communication channel to cause the fluid to at least partially vaporize so that it can subsequently flow in an upward direction through the third portion of the fluid communication channel to drive the second turbine generator 108b.

In a typical implementation, the system 100 of FIG. 1 can be operated as follows.

The system 100 enables fluid to flow, substantially under the influence of gravity, through the first portion of the fluid communication channel toward the second portion of the fluid communication channel that is in thermal communication with the subterranean hot area. The system converts, with the first turbine generator, kinetic energy of the fluid flowing through the first portion of the fluid communication channel into electrical energy. The valve arrangement can be manipulated (either manually or automatically) so as to hold the fluid in the second portion of the fluid communication channel that is in thermal communication with the subterranean hot area for a period of time. Moreover, the fluid can be released from the second portion of the fluid communication channel to flow, as vapor through a third portion of the fluid communication channel; and the system can convert, with the second turbine generator, kinetic energy of the vapor flowing within or out of the third portion of the fluid communication channel, into electrical energy.

Figure 2:
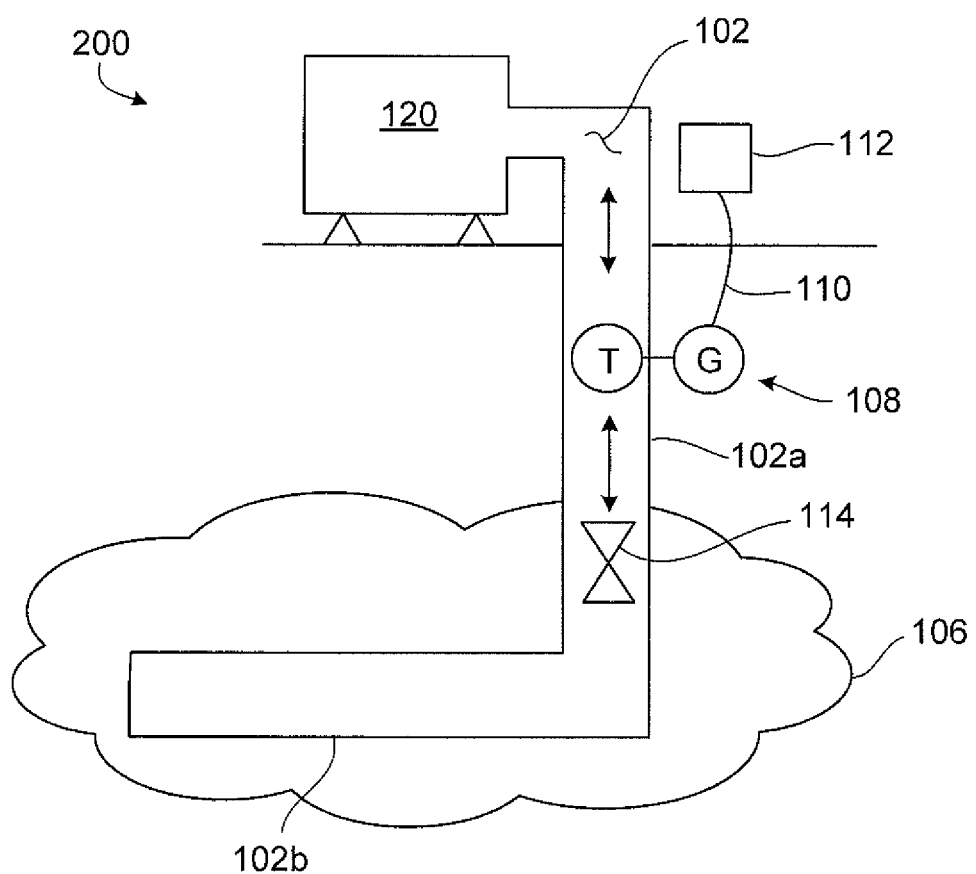
FIG. 2 is a schematic diagram showing an exemplary implementation of a hydroelectric and geothermal system 200.

As shown in FIG. 2, a hydroelectric and geothermal system 200 includes a fluid communication channel 102 with a first portion 102a that extends from the earth's surface toward a subterranean hot area 106 (e.g., hot dry rock) and a second portion 102b connected to the first portion and in thermal communication with the subterranean hot area 106.

A turbine generator 108 is configured to convert kinetic energy of a fluid flowing substantially under the influence of gravity in the first portion of the fluid communication channel into electrical energy; and to convert kinetic energy of a vapor flowing in the first portion of the fluid communication channel into electrical energy.

A valve arrangement (i.e., valve 114) is configured for manipulation to hold the fluid in the second portion of the fluid communication channel in thermal communication with the subterranean hot area to produce the vapor. In the illustrated example, the valve is between the turbine generator 114 and the second portion 102b of the fluid communication channel 102 that is in thermal communication with the subterranean hot area 106.

In some implementations, operation of the valve 114 is automated such that the valve 114 closes when a threshold volume of fluid is present in the second portion 102b of the fluid communication channel 102. In some implementations, operation of the valve 114 is further automated such that the valve 114 opens, after a period of time when the valve has been closed, under threshold conditions, to permit vapor that has formed in the second portion 102b of the fluid communication channel 102 to flow up through the first portion 102a of the fluid communication channel 102a to drive the turbine generator 108.

In some implementations, the turbine generator may be specially adapted to facilitate being driven by fluid flowing down the fluid communication channel and by vapor flowing up through the fluid communication channel.

In the illustrated system, the second portion 102b of the fluid communication channel 102 is in physical contact with the subterranean hot area 106.

Moreover, the illustrated system includes a vapor condensing unit 120 to condense the vapor after the vapor passes through the turbine generator.

Additionally, the turbine-generator 108 is connected to an electrical distribution panel 112 via wires 110.

In a typical implementation, the system 200 in FIG. 2 can be operated as follows.

The system 200 enables fluid to flow, substantially under the influence of gravity, through the first portion of the fluid communication channel toward the second portion of the fluid communication channel that is in thermal communication with the subterranean hot area 106. The system converts, with the turbine generator 108, kinetic energy of the fluid flowing through the first portion of the fluid communication channel into electrical energy. The valve arrangement (i.e., valve 114) can be manipulated to hold the fluid in the second portion of the fluid communication channel that is in thermal communication with the subterranean hot area for a period of time. The fluid can then be released from the second portion of the fluid communication channel and allowed to flow, as a vapor, through a first portion of the fluid communication channel. The system converts, with the turbine generator, kinetic energy of the vapor flowing in the first portion of the fluid communication channel, into electrical energy.

A number of implementations have been described. However, variations are possible. Accordingly, other implementations are within the scope of the claims.

What is claimed is:

1. A system comprising:
   a fluid communication channel comprising:
      a first portion that extends from the earth's surface toward a subterranean hot area;
      a second portion connected to the first portion and in thermal communication with the subterranean hot area; and
      a third portion connected to the second portion and that extends to the earth's surface;
   a first turbine generator configured to convert kinetic energy of a fluid flowing substantially under the influence of gravity in the first portion of the fluid communication channel into electrical energy;
   a second turbine generator configured to convert kinetic energy of a vapor flowing within or out from the third portion of the fluid communication channel into electrical energy; and
   a valve arrangement configured for manipulation to hold the fluid in the second portion of the fluid communication channel in thermal communication with the subterranean hot area to produce the vapor.

2. The system of claim 1 wherein the valve arrangement comprises:
   a first valve that is upstream of at least part of the second portion of the fluid communication channel that is in thermal communication with the subterranean hot area; and
   a second valve that is downstream of at least the part of the second portion of the fluid communication channel that is in thermal communication with the subterranean hot area.

3. The system of claim 2 wherein the first valve is in the first or second portion of the fluid communication channel downstream of the first turbine-generator, and
   wherein the second valve is in the second or third portion of the fluid communication channel upstream of the second turbine-generator.

4. The system of claim 2 wherein operation of the first valve and the second valve is automated such that the first valve and the second valve close when a threshold volume of fluid is present in the fluid communication channel between the first valve and the second valve.

5. The system of claim 4 wherein operation of the second valve is further automated such that the second valve opens, after a period of time when the first and second valves are closed, under threshold conditions, to permit vapor, that has formed in the fluid communication channel between the first and second valve to flow up through the third portion of the fluid communication channel.

6. The system of claim 1 wherein the second portion of the fluid communication channel is in physical contact with the subterranean hot area.

7. The system of claim 1 wherein the second turbine generator is above the earth's surface.

8. The system of claim 1 further comprising a vapor condensing unit between the third portion of the fluid communication channel and the first portion of the fluid communication channel.

9. The system of claim 1 wherein the first and second turbine-generators are connected to one or more electrical distribution panels via wires.

10. The system of claim 1 wherein the subterranean hot area is hot dry rock.

11. The system of claim 1 wherein the fluid is composed partially of $CO_2$.

12. A method comprising:
    enabling fluid to flow, substantially under the influence of gravity, through a first portion of a fluid communication channel toward a second portion of the fluid communication channel that is in thermal communication with a subterranean hot area;
    converting, with a first turbine generator, kinetic energy of the fluid flowing through the first portion of the fluid communication channel into electrical energy;
    manipulating a valve arrangement to hold the fluid in the second portion of the fluid communication channel that is in thermal communication with the subterranean hot area for a period of time;
    releasing the fluid from the second portion of the fluid communication channel to flow, as vapor through a third portion of the fluid communication channel; and
    converting, with a second turbine generator, kinetic energy of the vapor flowing within or out of the third portion of the fluid communication channel, into electrical energy.

13. A system comprising:
    a fluid communication channel comprising:
       a first portion that extends from the earth's surface toward a subterranean hot area; and
       a second portion connected to the first portion and in thermal communication with the subterranean hot area; and
    a turbine generator configured:
       to convert kinetic energy of a fluid flowing substantially under the influence of gravity in the first portion of the fluid communication channel into electrical energy; and
       to convert kinetic energy of a vapor flowing in the first portion of the fluid communication channel into electrical energy; and
    a valve arrangement configured for manipulation to hold the fluid in the second portion of the fluid communication channel in thermal communication with the subterranean hot area to produce the vapor.

14. The system of claim 13 wherein the valve arrangement comprises:
    a valve that is between the turbine generator and the second portion of the fluid communication channel that is in thermal communication with the subterranean hot area.

15. The system of claim 14 wherein operation of the valve is automated such that the valve closes when a threshold volume of fluid is present in the second portion of the fluid communication channel.

16. The system of claim 15 wherein operation of the valve is further automated such that the valve opens, after a period of time when the valve is closed, under threshold conditions, to permit vapor, that has formed in the second portion of the fluid communication channel to flow up through the first portion of the fluid communication channel.

17. The system of claim 13 wherein the second portion of the fluid communication channel is in physical contact with the subterranean hot area.

18. The system of claim 13 further comprising a vapor condensing unit to condense the vapor after the vapor passes through the turbine generator.

19. The system of claim 13 wherein the turbine-generator is connected to one or more electrical distribution panels via wires.

20. The system of claim 13 wherein the subterranean hot area is hot dry rock.

21. The system of claim 13 wherein the fluid is composed partially of $CO_2$.

22. A method comprising:
   enabling fluid to flow, substantially under the influence of gravity, through a first portion of a fluid communication channel toward a second portion of the fluid communication channel that is in thermal communication with a subterranean hot area;
   converting, with a turbine generator, kinetic energy of the fluid flowing through the first portion of the fluid communication channel into electrical energy;
   manipulating a valve arrangement to hold the fluid in the second portion of the fluid communication channel that is in thermal communication with the subterranean hot area for a period of time;
   releasing the fluid from the second portion of the fluid communication channel to flow, as vapor through a first portion of the fluid communication channel; and
   converting, with the turbine generator, kinetic energy of the vapor flowing in the first portion of the fluid communication channel, into electrical energy.

* * * * *